(No Model.)  6 Sheets—Sheet 1.

R. H. MATHER.
STEAM ENGINE.

No. 386,548. Patented July 24, 1888.

Witnesses.
Frank H. Durfont.
Chas. M. Wales.

Inventor
Richard H. Mather
By his Attorney
Willard Eddy (No Model.)　　　　　　R. H. MATHER.　　　　6 Sheets—Sheet 3.
STEAM ENGINE.

No. 386,548.　　　　　　　　　　　Patented July 24, 1888.

Witnesses.
Frank H. Pierpont.
Chas. M. Wales.

Inventor.
Richard H. Mather.
By his Attorney
Willard Eddy (No Model.) 6 Sheets—Sheet 4.

R. H. MATHER.
STEAM ENGINE.

No. 386,548. Patented July 24, 1888.

Witnesses,
Frank H. Pierpont.
Chas. M. Wales.

Inventor
Richard H. Mather
By his Attorney
Willard Eddy.

(No Model.) 6 Sheets—Sheet 5.

R. H. MATHER.
STEAM ENGINE.

No. 386,548. Patented July 24, 1888.

Witnesses.
Frank H. Pierpont
Chas. M. Wales

Inventor,
Richard H. Mather.
By his Attorney
Willard Eddy.

(No Model.) 6 Sheets—Sheet 6.
R. H. MATHER.
STEAM ENGINE.
No. 386,548. Patented July 24, 1888.
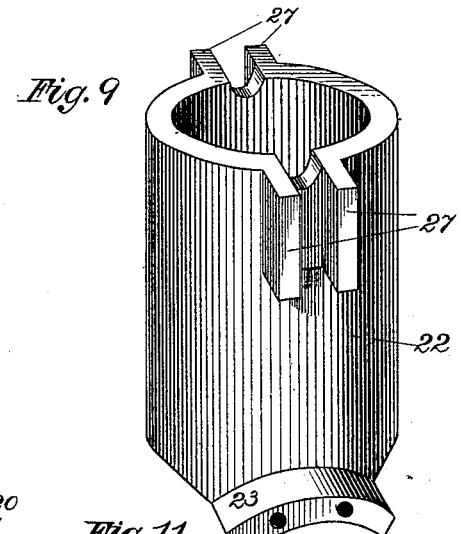
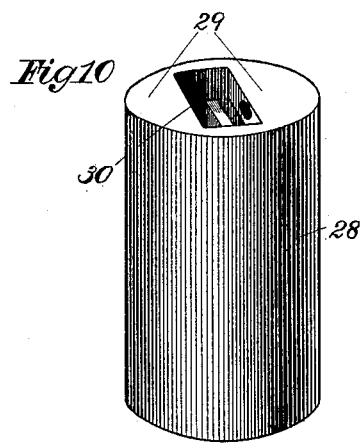
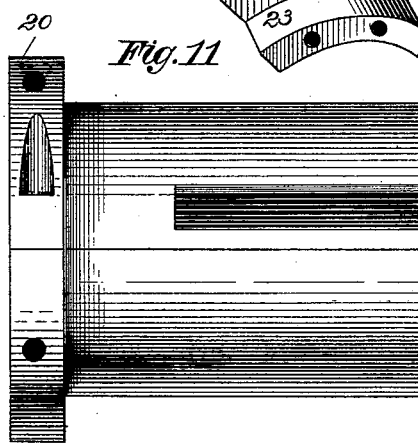
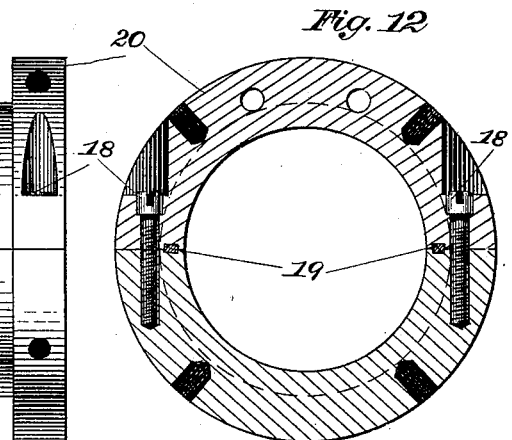
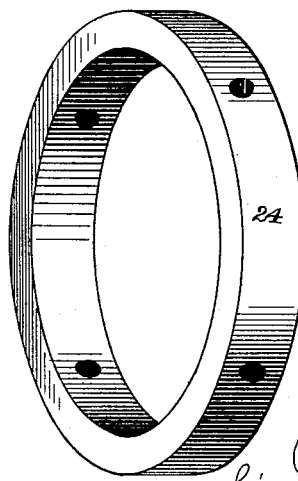
Witnesses.
Frank H. Pierpont
Chas. M. Wales.
Inventor,
Richard H. Mather,
By his Attorney
Willard Eddy.

UNITED STATES PATENT OFFICE.

RICHARD H. MATHER, OF WINDSOR, CONNECTICUT.

STEAM-ENGINE.

SPECIFICATION forming part of Letters Patent No. 386,548, dated July 24, 1888.

Application filed April 19, 1886. Serial No. 199,323. (No model.)

*To all whom it may concern:*

Be it known that I, RICHARD H. MATHER, of the town of Windsor, county of Hartford, and State of Connecticut, have invented certain new and useful Improvements in Steam-Engines, of which the following is a specification, illustrated by the accompanying drawings.

This invention is a reciprocating single-acting revolving-cylinder steam-engine in which one or more steam-cylinders are mounted radially upon a hollow crank which serves as a combined steam and exhaust pipe.

Figure 1:
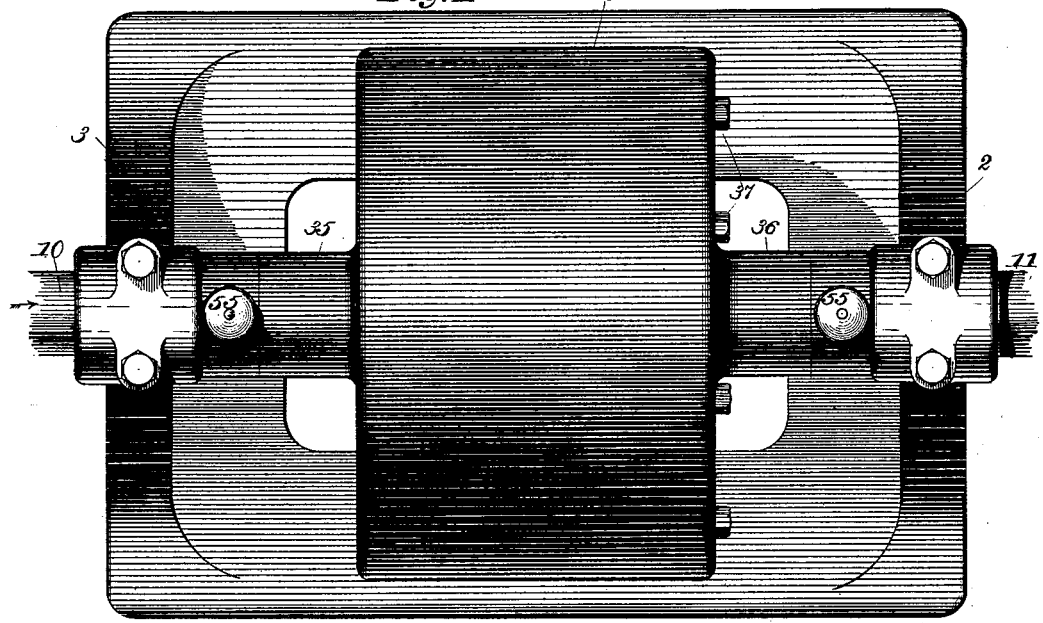
Figure 2:
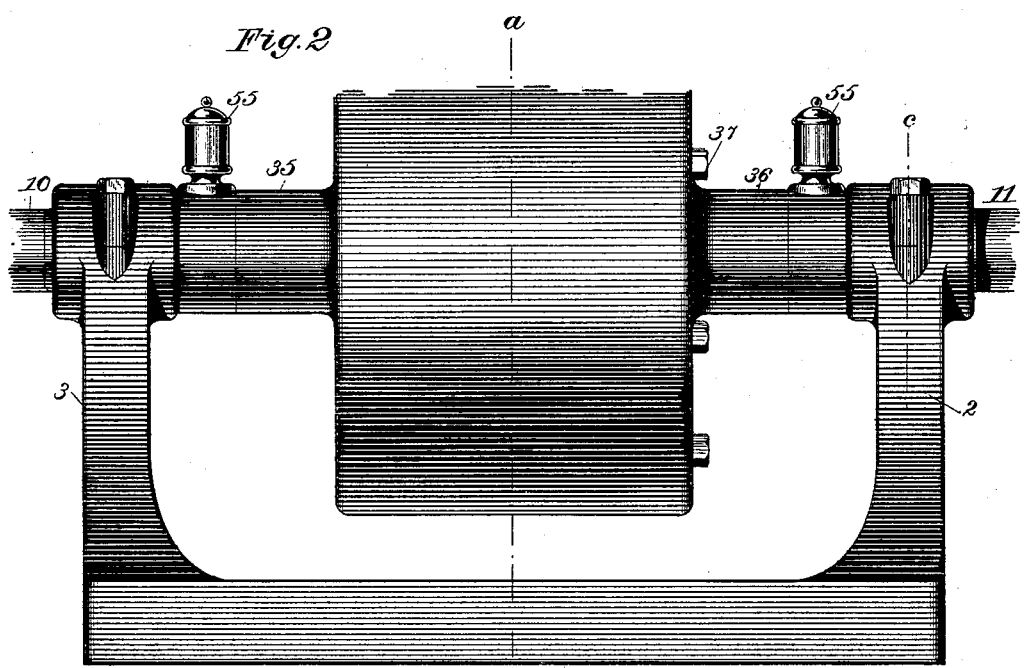
Figure 3:
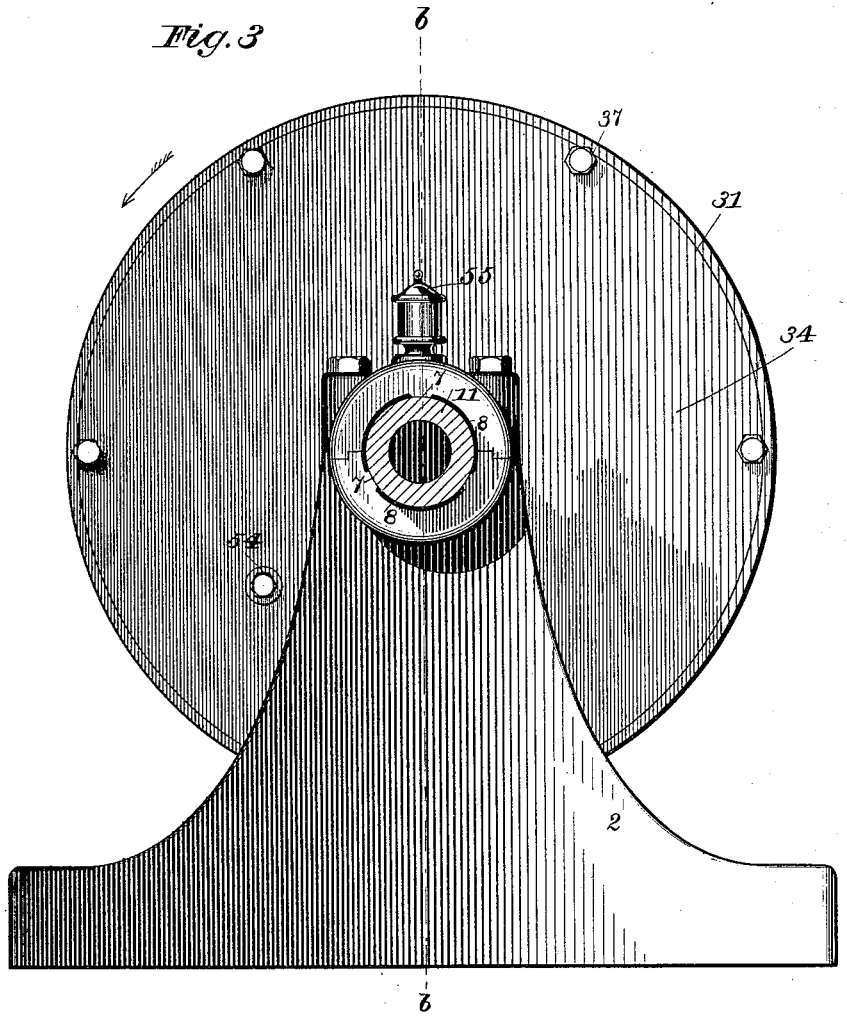
Figure 4:
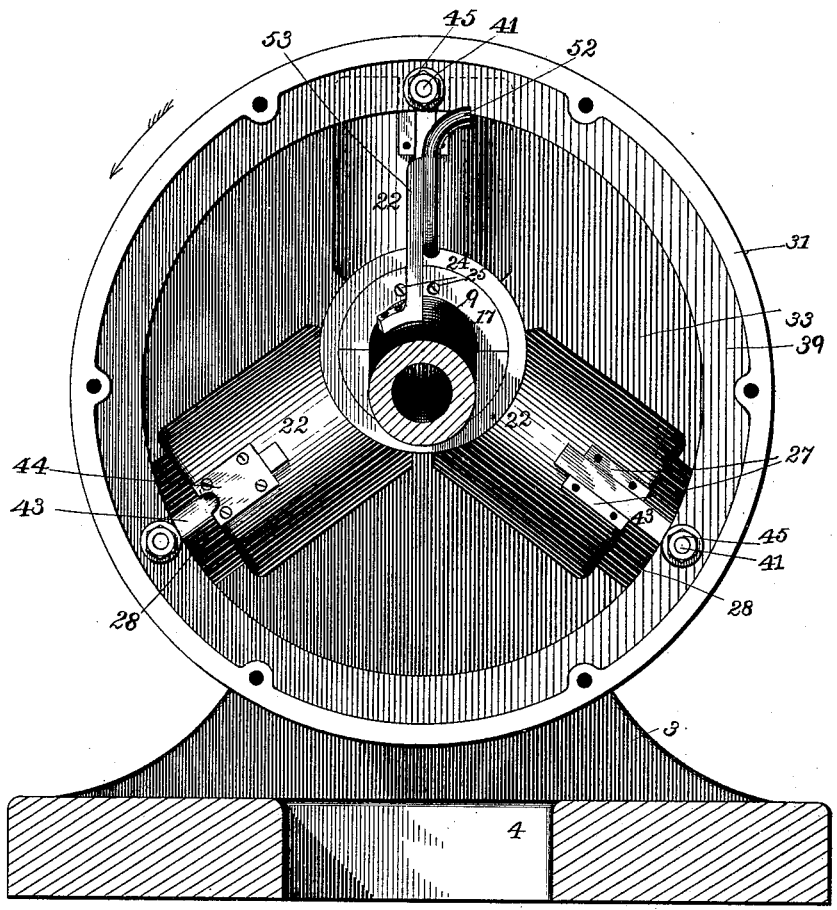
Figure 5:
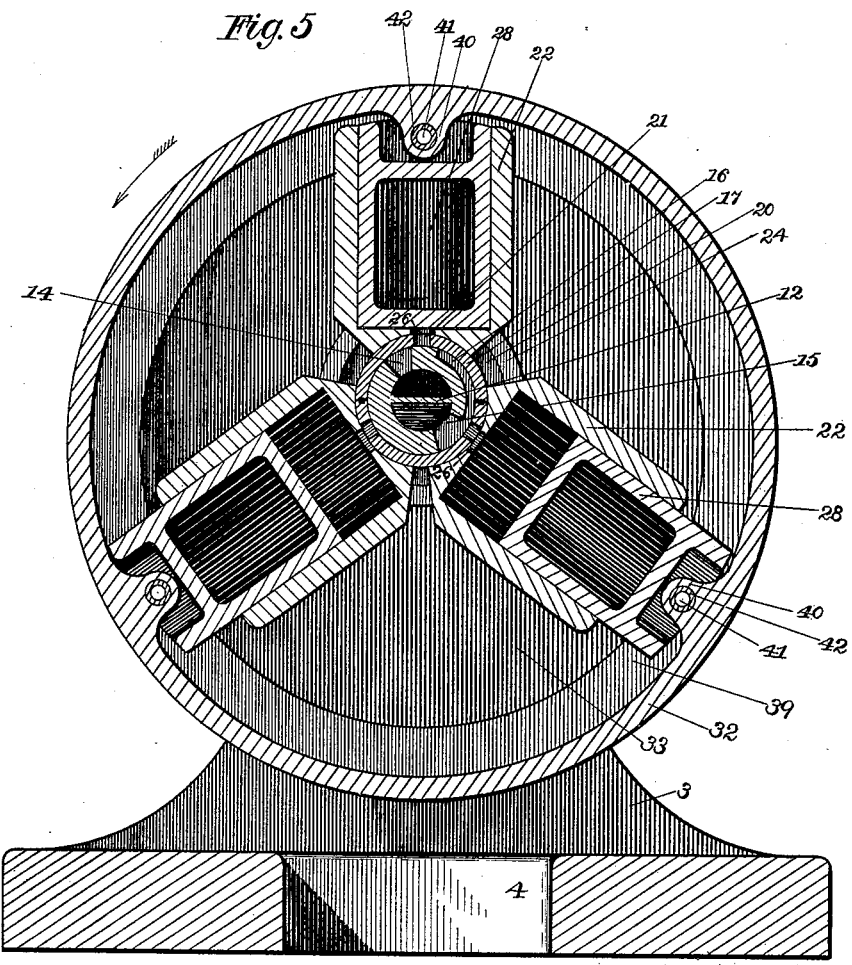
Figure 6:
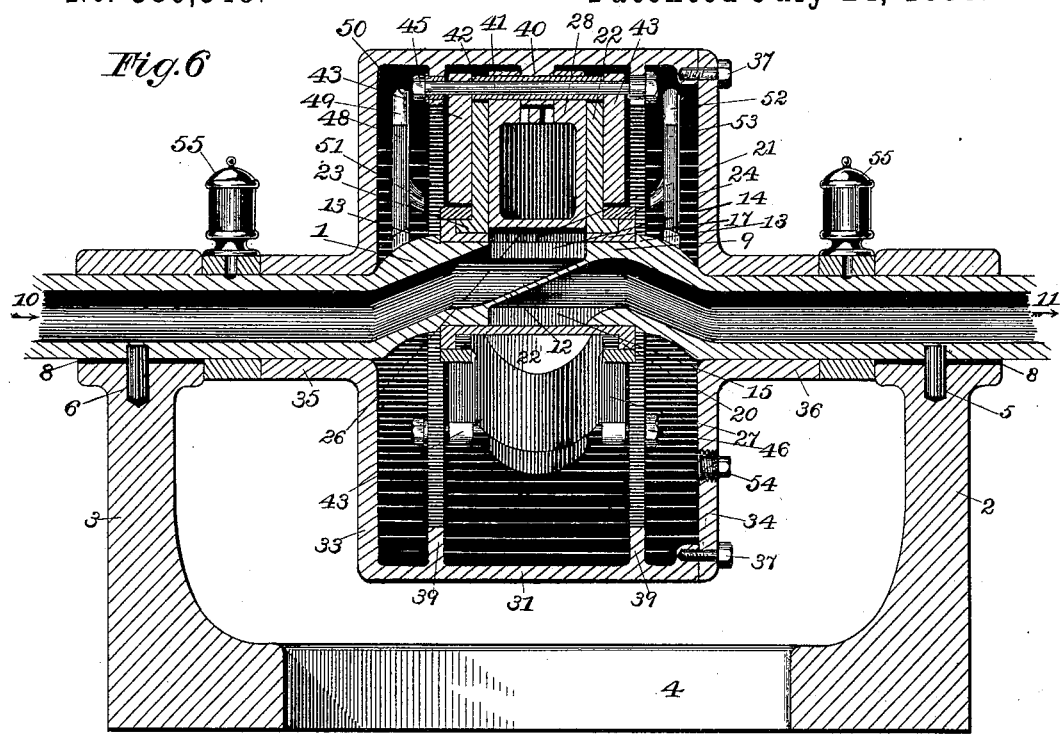

In said drawings, each of which, considered alone, is a scale-drawing, Figure 1 is a plan view of the engine. Figs. 2 and 3 are front and side views of the same, respectively. Fig. 4 is a side view of the same with a drum-head removed. Fig. 5 is a section on $a\,a$ of Fig. 2. Fig. 6 is a section on $b\,b$ of Fig. 3. Figs. 7, 8, 9, 10, 11, 12, 13, and 14 are details.

Figure 7:
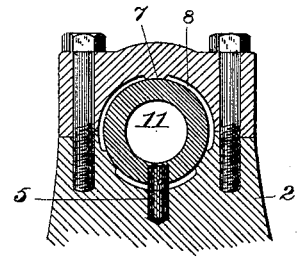
Figure 8:
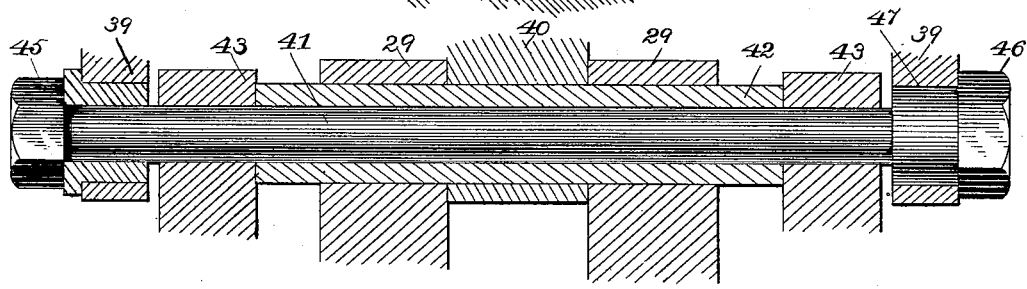

1 is a stationary double crank, being a single hollow casting, of irregular cylindrical form, mounted horizontally upon standards 2 and 3 of the frame 4. Crank 1 is held against rotation in its bearings in standards 2 and 3 by pins 5 and 6, and is kept from contact with the main body of said standards by a convenient number of metallic ribs, 7, which project inward from the main body of said standards, are separated from each other by intermediate chambers, 8, filled with air or other thermally-insulating substance, and furnish bearing-surfaces for the support of said crank, as shown in Fig. 7, which is a cross-section on $c\,c$ of Fig. 2. The interior of crank 1 is divided at the middle of the eccentric 9 into steam-pipe 10 and exhaust-pipe 11 by an oblique metallic diaphragm, 12. The maximum offset of the eccentric 9 is equal to one-third the diameter of the steam-cylinder, hereinafter described. The middle part of eccentric 9 is straight and has its longitudinal axis parallel to that of the non-eccentric parts of crank 1 for a distance which exceeds the diameter of said steam-cylinder. The eccentric and concentric parts of crank 1 meet at obtuse angles, and have a continuous internal diameter which is equal to one-half the diameter of said steam-cylinder. Two like and parallel flanges or annular shoulders, 13 and 13, encircle eccentric 9 at equal distances from the center of said eccentric and at a distance apart greater than the diameter of said steam-cylinder. An oblong opening in steam-pipe 10 through the cylindrical wall of eccentric 9, being equal in length to the diameter of the piston hereinafter mentioned, and having a width which will hereinafter appear, constitutes the steam-port 14; and a like opening in exhaust-pipe 11 through the opposite cylindrical wall of eccentric 9, being equal in length to the diameter of said piston and equal in area to twenty-five per cent. of the piston area, constitutes the exhaust-port 15. Just forward of exhaust-port 15 the exterior of eccentric 9 presents a channel, 16, which is equal in length to said exhaust-port, is continuous therewith, is equal in depth to one-half the thickness of the cylindrical wall of eccentric 9, and is sufficient in width to reach around nearly to steam-port 14.

Crank 1, with ports, diaphragm, &c., as described, is a single iron casting. A cylindrical iron sleeve, 17, filling all the space between flanges 13 and 13, surrounds eccentric 9 and is rotatable thereon. This sleeve, which is shown in elevation and in section, respectively, in Figs. 11 and 12, is made, like a split tube, in two equal parts or semi-cylindrical segments, which are held together by suitable screws, 18. Said segments are also united in steam-tight joints by means of two metallic tongues, 19 and 19, each of which is let into longitudinal close-fitting grooves in contiguous edges of said segments. Sleeve 17 enlarges at both ends into like annular flanges 20 and 20, which project radially from said sleeve to a distance not less than its general thickness. Three oblong openings through the cylindrical wall of sleeve 17, being equal in length to the diameter of said piston and having an area equal to fifteen per cent. of the piston area, constitute the steam and exhaust ports 21 21 21, which are so located that if sleeve 17 be rotated upon eccentric 9 said ports will pass successively over steam-port 14 and exhaust-port 15. The exact position of ports 21, which are approximately one hundred and twenty degrees apart in the circumference of sleeve 17, will appear later in the present description.

Upon sleeve 17 are radially mounted three steam-cylinders, 22, 22, and 22, which are of uniform size and description. Fig. 9 is a perspective view of one of these cylinders. Each of said steam-cylinders, being of general cylindrical form, is open at one end, which may be called the "top," and, except as hereinafter stated, is closed at the other end, which may be called the "bottom," of such cylinder.

Each cylinder 22 is provided at the bottom with two curved feet, 23, which form an integral part of such cylinder, and project therefrom laterally in opposite directions in a uniform thickness equal to the depth of flanges 13 and 13. Externally the bottom of each steam-cylinder 22, including its two feet, 23 and 23, is concave upon the same radius as sleeve 17, and rests upon the latter in close contact therewith. Two like and equal metallic rings, 24 and 24, one of which is shown in perspective in Fig. 13, fitted closely upon the peripheries of flanges 20 and 20, respectively, serve to hold the two segments of sleeve 17 together with additional firmness, and, extending over all said feet 23, serve also to hold cylinders 22 closely upon said sleeve in radial positions. One of said cylinders 22 is made fast to sleeve 17 by means of screws 25, which pass through each flange 20 into each foot 23 of said cylinder.

A central opening through the bottom of each cylinder 22, being of the same general form as ports 21 and being equal in area to twenty per cent. of the piston area, constitutes the steam and exhaust port 26 in each of said cylinders. In case of that cylinder 22, which is attached to sleeve 17 by screws 25, as just described, port 26 is constantly over one and the same port 21 of sleeve 17.

On the outside of each cylinder 22, and directly above each of its feet 23, is a pair of equally-projecting parallel lugs or guides, 27, which extend from the top or outer end of the cylinder, about one-third of its length, toward the bottom of the same, and are of suitable size and distance apart to accommodate the slide 42, hereinafter mentioned.

Each steam-cylinder 22 is provided with piston 28, which is shown in perspective in Fig. 10. Piston 28, being a hollow cylinder closed at the bottom, is partly closed at the top by means of a circular head-piece, which is divided into two separate segments, 29 29, by means of a central transverse channel, 30, of suitable size for the accommodation of the lug 40, hereinafter mentioned. Steam-cylinders 22, including pistons 28, being thus mounted revolubly upon eccentric 9, are collectively inclosed with said eccentric in drum 31, and are severally attached thereto in the manner about to be described. Drum 31 is a cast-iron belt-wheel, consisting of a cylindrical shell, 32, and two circular parallel drum-heads, 33 and 34, which are respectively provided with central hubs, 35 and 36, by means of which said drum is mounted rotatably upon the non-eccentric parts of crank 1 as a crank-shaft. Hubs 35 and 36 are elongated, like sleeves, and present large internal bearing surfaces or journals upon crank 1. Drum-head 33 is integrally connected with shell 32; but drum-head 34 is a separable disk, which is united to shell 32 in an impervious joint by means of bolts 37.

Within drum 31 are two like annular rings, 39 and 39, being parallel to drum-heads 33 and 34 and projecting for a short distance inwardly from shell 32, at a distance from each other exceeding the extreme width of steam-cylinder 22, including its guides 27. Midway between drum-heads 33 and 34, and midway between rings 39 and 39, are three lugs, 40, projecting inwardly from shell 32 at equal distances of one hundred and twenty degrees from each other, measured upon the inner surface of said shell. Through each lug 40 and the adjacent part of each ring 39, and at a right angle with the latter, passes a straight cylindrical steel bar, 41. This bar and the parts through which it passes are shown in detail in Fig. 8, which is a mere enlargement of a part of Fig. 6. Upon the middle part of each bar 41 is a metallic sleeve, 42, whose length is equal to the diameter of each steam-cylinder 22. Upon the middle of sleeve 42 is one of said lugs 40, and upon each side of said lug and upon the same sleeve are the two segments 29 and 29 of the head of piston 28. Sleeve 42 extends radially in each direction beyond the outside of the piston-head a distance equal to the thickness of the wall of cylinder 22. Beyond the ends of sleeve 42 bar 41 passes through two slides, 43. Each of these slides is a strip or bar of metal fitted between guides 27 for longitudinal motion only, and held in position between the same by caps or cross-pieces 44 and 44. Bar 41 is held in the described position by the terminal nut 45 and head 46, and is enlarged near head 46 in a neck, 47, whose diameter is as large as that of sleeve 42. A hole in ring 39, through which sleeve 42 is introduced into the position above described, is filled by this neck.

A suitable standard, 48, based upon steam-pipe 10, between sleeve 17 and drum head 33, supports oil-pipe 49, which is thus mounted immovably between said drum head and the path of the revoluble cylinders 22. Oil-pipe 49 is open from end to end. Its middle part may conveniently be straight and parallel to a radius of either drum head. Near its outer end this oil-pipe is nearly or quite parallel to said drum-heads, and is curved through an angle of about ninety degrees, so as to present a mouth, 50, opening backward. The lower or inner end of oil-pipe 49 is bent away from said drum-head in the form of a nozzle, 51, which is directed toward the adjacent shoulder 13, flange 20, foot 23, and ring 24, above described. A similar oil-pipe, 52, having its mouth turned backward and its nozzle turned inward, is mounted in a like position between drum-head 34 and the path of said revoluble cylinders by means of a like standard, 53, similarly located upon exhaust-pipe 11. Through either of said drum-heads, at a point preferably about one-third of the radius of such drumhead distant from the center of the same, is an oil-hole, 54, which is of sufficient size for the convenient introduction of lubricating-oil into drum 31.

The remaining features of construction of this engine will sufficiently appear from the drawings and from the mode of operation which is now to be described.

Before starting up the engine-drum 31 is nearly one-fourth filled with lubricating-oil. Steam under pressure is then let into the steam-pipe in the usual manner. If the engine chances to be standing at the dead-point, as seen in Fig. 5, it is necessary to turn the drum by hand or by other extraneous force until that point is passed. The engine then begins to work. Steam from steam-pipe 10 is admitted successively into each steam-cylinder 22, in one and the same position, by the way of steam-ports 14 and steam and exhaust ports 21 and 26. The position of ports 21 in sleeve 17 is such that each steam-cylinder begins to take steam as soon as that cylinder passes the dead point or center. Thus drum 31 is rotated in the direction indicated by the arrow in Figs. 4 and 5, and thereby steam is permitted to escape into exhaust-pipe 11 from each of said cylinders in succession by way of exhaust-port 15 and the same steam and exhaust ports 21 and 26, and continues so to escape from each steam-cylinder until the port of that cylinder and the adjacent steam-port 21 have in their revolution passed over and beyond said exhaust-channel 16—that is to say, during nearly one-half of such revolution. Rings 24 and 24 hold cylinders 22 closely upon sleeve 17, and the latter upon eccentric 9 between flanges 20, in such a manner as to allow the revolution of said cylinders and sleeve, as well as the limited oscillation of two of said cylinders upon said sleeve, without loss of steam. At the same time said flanges 19 prevent sleeve 17 from moving longitudinally upon eccentric 9. The guides 27, with the slides 43 playing between the same, cause the drum 31 and cylinders 22 to revolve together without undue strain or wear upon pistons 28 or upon the surfaces contiguous to said pistons. The lubricating-oil, which is contained in drum 31, partakes of the rotary motion of that drum, distributes itself centrifugally in the outer portion of the same, and forces itself into the stationary oil-pipes in such a manner that each of said oil-pipes 49 and 52 receives a constant supply of oil at its mouth, and discharges the same at its nozzle with continuous force upon the parts toward which said nozzle is directed, as above described. The load is applied to the belt wheel or drum 31 in any convenient manner.

Among the advantages presented in this engine is the fact that since the thrust of the piston is always in one and the same direction, coinciding with the direction of the centrifugal force, the engine works without pounding, and hence can be run at any speed allowed by the strength of the material of which it is built.

It is also to be observed that the centripetal thrust of each steam-cylinder tends to maintain steam-tight joints with the steam-pipe, however much or little the intermediate bearing-surfaces may be worn by use.

The essence of this invention does not reside in the number of steam-cylinders employed, for, essentially, the same engine can be built with a greater or less number of steam-cylinders. The latter should balance each other about the crank, and, preferably, should be three in number, as shown. Neither is it essential to preserve exactly that distribution of steam which is presented in the foregoing description. In the engine above described each cylinder is designed to take steam during one-third the stroke of the piston and to allow the escape of steam during almost the entire return stroke; but if it be desired to modify the action of the engine in either of these particulars, the width of the steam-ports or exhaust-ports may be modified accordingly, and thus any desired distribution of steam may be obtained.

A modification is exhibited in Fig. 14, which is a partial section on $a\,a$ of Fig. 2. In this modification the outer end of steam-port 14 is enlarged by means of a channel, 56, in the outer surface of eccentric 9. Channel 56 is as long as said steam-port, is half as deep as the thickness of the cylindrical wall of eccentric 9, and in width extends forward nearly to exhaust-port 15. The engine so modified presents no dead-point and can be run as a water-motor.

I claim as my invention—

1. A tubular shaft having the form of a double crank and provided with an oblique internal diaphragm dividing the eccentric portion of said shaft into two overlapping compartments, which are respectively provided with a steam-port and with an exhaust-port which open through opposite sides of said shaft, in combination with a number of steam-cylinders which are radially disposed about the eccentric portion of said shaft and are mounted at a variable inclination toward each other upon a rotary sleeve which is immovably attached to one of said cylinders and is provided with a single steam and exhaust port for each of them, substantially as and for the purpose specified.

2. A tubular shaft consisting of a single piece of metal having the form of a double crank and provided with an oblique internal diaphragm dividing the eccentric portion of said shaft into two overlapping compartments, one of said compartments being provided with a steam-port which opens from the overlapping portion of such compartment through the side wall of said shaft, and the other of said compartments being provided with an exhaust-port which opens through the opposite wall of said shaft into the overlapping portion of such other compartment, in combination with a number of steam-cylinders which are radially disposed about said shaft at a variable distance from each other, and an intermediate rotary sleeve which is provided with one steam and exhaust port for each of said cylinders and is rigidly attached to one of said cylinders, substantially as and for the purpose specified.

3. In an engine of the kind described, a metallic pipe, bent as shown, mounted as a stationary crank upon suitable standards and partly insulated therefrom by means of air-spaces formed by intermediate ribs, substantially as and for the purpose specified.

4. A steam-cylinder which is provided with two laterally-projecting curved feet and terminates, continuously with such feet, in a cylindrically-concave bottom surface which is perforated by a steam and exhaust port, substantially as and for the purpose specified.

5. A steam-cylinder whose base, being cylindrically concave, is perforated by a steam and exhaust port and is provided with two laterally-projecting curved feet, substantially as and for the purpose specified.

6. A tubular shaft having the form of a double crank, a rotary cylindrical drum which is mounted upon the concentric portion of said shaft, and a number of steam-cylinders which are provided with lateral curved feet and with pistons hinged immediately to said drum and are disposed radially about said shaft, in combination with two metallic rings passing over said feet, and a sleeve which is provided with steam and exhaust ports and is attached to one of said cylinders and surrounds said shaft, substantially as and for the purpose specified.

7. In combination with a rotating drum and inclosed therein, a stationary open oil-pipe whose ends are unequally distant from the axis of such drum, and whose mouth is turned in a direction opposed to the direction of rotation of such drum, substantially as and for the purpose specified.

8. A hollow crank, a sleeve surrounding the same, and one or more revoluble cylinders mounted upon said sleeve, in combination with a surrounding belt-wheel to which the piston of each such cylinder is hinged, substantially as and for the purpose specified.

9. In a steam-engine whose working parts are located in a rotary cylinder adapted to contain oil, a stationary oil-pipe having a mouth opening backward in the outer portion of said cylinder and a discharging-orifice directed toward the crank-shaft bearings, substantially as and for the purpose specified.

10. A tubular shaft having the form of a double crank, a sleeve surrounding the eccentric portion of said shaft, and one or more cylinders mounted upon said sleeve, in combination with a surrounding drum to which the piston of each such cylinder is hinged, substantially as and for the purpose specified.

11. As a means of holding upon a cylindrical crank one or more steam-cylinders and an intermediate sleeve, two feet projecting from each such cylinder in opposite directions, and two flanges upon such sleeve, in combination with two metallic rings fitted closely over such feet and flanges, substantially as and for the purpose specified.

12. A metallic rod provided with a terminal nut and head or their equivalents, and having a neck adjacent to such head, a sleeve or steel tube surrounding the middle part of such rod, and a piston whose head is attached to such sleeve, in combination with an inclosing belt-wheel to which said rod and sleeve are attached by means of lugs or other suitable projections, substantially as and for the purpose specified.

13. A number of steam-cylinders provided with pistons which are hinged to a wheel or drum and are radially mounted by a sleeve upon the eccentric portion of a stationary tubular shaft having the form of a double crank, substantially as and for the purpose specified.

14. In combination, a number of steam-cylinders distributed about a common axis of rotation in radial positions relatively to that axis, and mounted upon a sleeve which is rigidly attached to one of said cylinders, substantially as and for the purpose specified.

15. In combination, a number of steam-cylinders which are distributed radially about a common axis of rotation and are mounted at a variable distance apart upon a sleeve which is rigidly attached to one of said cylinders, substantially as and for the purpose specified.

In testimony thereof I have hereunto set my name in the presence of two witnesses.

RICHARD H. MATHER.

Witnesses:
RALPH H. PARK,
WILLARD EDDY.